United States Patent [11] 3,591,163

[72] Inventor Richard D. Anderson
866 South Charles Street, Elgin, Ill. 60120
[21] Appl. No. 874,631
[22] Filed Nov. 6, 1969
[45] Patented July 6, 1971

[54] MOUNTING
5 Claims, 5 Drawing Figs.
[52] U.S. Cl. .................................................. 267/52,
287/189.36
[51] Int. Cl. ..................................................... B60g 11/02
[50] Field of Search .......................................... 287/189.36
F; 85/51; 267/52

[56] References Cited
UNITED STATES PATENTS
1,232,934  7/1917  Kirk .............................. 267/52
1,530,729  3/1925  Laher ............................ 267/52
2,177,148  10/1939 Newhall ........................ 287/58
2,678,819  5/1954  Douglass ...................... 267/52
2,972,386  2/1961  Tanke .......................... 287/189.36 F X
3,008,368  11/1961 Hammitt et al. ............. 287/189.36 F X FOREIGN PATENTS
452,059  8/1936  Great Britain ............... 267/52
568,460  4/1945  Great Britain ............... 85/51
205,849  1/1957  Australia ..................... 287/189.36 F Primary Examiner—Reinaldo P. Machado
Assistant Examiner—Andrew V. Kundrat
Attorney—Molinare, Allegutti, Newitt & Witcoff ABSTRACT: A mounting construction illustrated as used on a vehicle traction bar includes a rigid plate for mounting articles in situations requiring a variety of dimensions between mounting bolts. A plurality of tapered apertures are formed in the plate and plugged with the tapered scrap pieces from which they were formed. Each scrap piece is provided with a notch or aperture to receive a bolt, and each of the scrap piece plugs may be selectively oriented in its aperture to provide for a varied spacing between the bolt-receiving apertures.

PATENTED JUL 6 1971 3,591,163
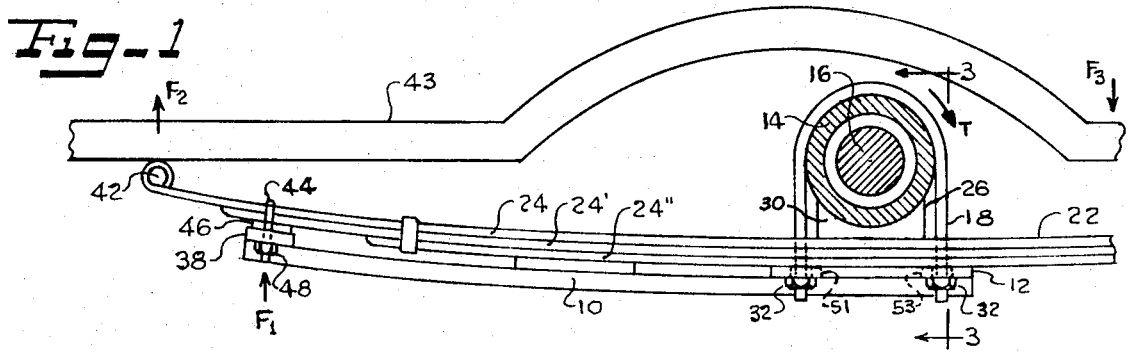
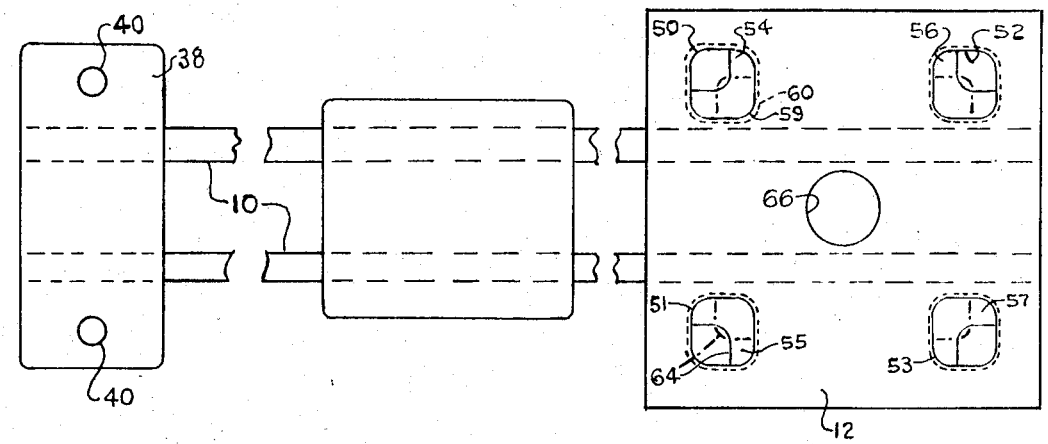
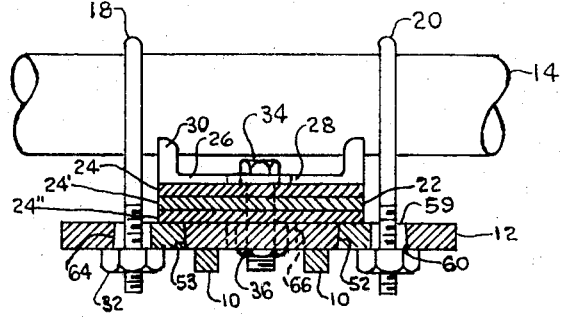
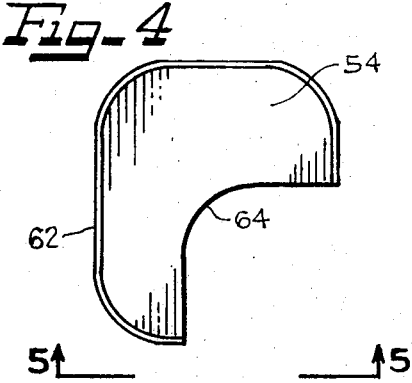
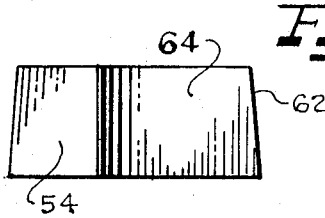
INVENTOR
RICHARD D. ANDERSON
Bair, Freeman & Molinare
ATTORNEYS 3,591,163

MOUNTING

BACKGROUND AND SUMMARY OF THE INVENTION

This invention relates to a mounting and is illustrated as a mounting for a vehicle traction bar.

Elongated rigid traction bars have been provided in the past for improving traction during periods of high vehicle acceleration. Such bars are generally adapted to be bolted at one end to the rear axle of the vehicle and to extend forward therefrom to where they are attached at their other end adjacent the frame of the vehicle. These bars act to increase the traction of the vehicle wheels by transmitting the torque which occurs about the rear axle as a result of high acceleration to the frame of the vehicle so as to increase traction of the tires during such periods of acceleration. The prior traction bars generally include an enlarged plate at one end of the bar for mounting the bar to the rear axle housing by way of U-bolts, the springs of the vehicle being clamped between the plate and the axle housing. Since the width of the springs and the diameter of the axle housing between different vehicles might be as varied as the number of different vehicles which are available, as many as 50 different traction bar assemblies must presently be stocked in order to fit the different vehicles.

The mounting constructed in accordance with the principles of my invention obviates the need for such multiple traction bar stocking requirements since the mounting incorporating the principles of my invention enables one, or at the most a few, traction bars to be mounted on, and completely interchangeable between, the various different vehicles. In the mounting of my invention, a single mounting may be employed in any one of numerous different vehicles in which the spring width and/or axle housing diameter varies widely between the vehicles. Moreover, in forming the mounting of my invention, only a single blank need be employed and substantially all the components of the mounting may be formed from the scrap pieces which result during the course of manufacture of the mounting. This principle can be applied to a variety of mounting problems where dimensions vary between models.

In the mounting of my invention, a plurality of tapered apertures are formed by removing tapered symmetrical scrap pieces from a rigid plate. I have shown these pieces as having four equal sides. However, these pieces may have three, five, six or any other number of sides, as long as they are not round. A rectangular piece will provide two mounting distances, a triangle three, etc. An offset hole is then formed in each of the scrap pieces and the scrap pieces are then selectively reinserted and oriented in the apertures so that the spacing between the offcenter holes is approximately equal to the spacing of the bolts which mount the plate.

These and other objects, features and advantages of the present invention will be more clearly understood through a consideration of the following detailed description.

BRIEF DESCRIPTION OF THE DRAWING

In the course of this description, reference will frequently be made to the attached drawing in which:

FIG. 1 is a side elevation view of a traction bar as mounted on the rear axle and spring assembly of a vehicle and which employs a preferred embodiment of mounting of my invention;

FIG. 2 is an enlarged broken plan view of the traction bar and mounting of my invention;

FIG. 3 is a rear cross-sectioned elevation view taken substantially along line 3-3 of FIG. 1;

FIG. 4 is a plan view of a scrap plug of the mounting of my invention; and

FIG. 5 is a side elevation view of the plug taken substantially along line 5-5 of FIG. 4.

DESCRIPTION OF THE PREFERRED EMBODIMENT

In the past, traction bars have been provided for transmitting the torque from the rear axle of a vehicle to the frame of the vehicle during periods of high acceleration. These bars have for a purpose the increase of traction on the rear wheels of the vehicle during such periods and to counteract the tendency of the leaf springs of the vehicle to buckle.

In FIG. 1 a traction bar assembly is shown which includes one or more rigid elongated bars 10 which are welded at one end to the underside of a rear-mounting plate 12. The traction bar is mounted to and beneath the rear axle housing 14 of the vehicle which houses the rotating axle 16 therein by way of a pair of downward extending spaced U-bolts 18 and 20 which straddle the axle housing 14 of the vehicle and extend through spaced holes in plate 12. The leaf spring 22 comprises a single leaf or a plurality of leaves, for example 24, 24' and 24''. A saddle member 26, usually welded to the axle housing, is preferably provided which has a substantially horizontal web 28 and a pair of upstanding end flanges 30 each with a concave upper axle housing receiving edge formed thereon. The spring leaves are clamped between the saddle member 26 and the upper surface of the mounting plate 12 when nuts 32 are threaded on the bolts 18 and 20 and upward against the underside of the plate. In addition the leaves 24, 24' and 24'' of the leaf spring 22 are bolted firmly together by way of a bolt 34 which extends downward through a locating hole in the saddle web and the leaves of the spring, and a nut 36 is threaded on the end of the bolt to compress the leaves firmly together.

The beams 10 extends forward in underlying relationship to the leaf spring 22 and a flat plate 38 is fixed transverse to the axis of the beams at the other end of the beams as by welding. The plate 38 includes a pair of spaced holes 40. The forward end of the traction bar is attached to the underside of the leaf spring 22 adjacent the forward point of attachment 42 of the spring to the frame 43 of the vehicle by a U-bolt 44 which overlies the spring and which extends downward in straddling relationship to the leaf spring through the holes 40. A suitable shim member 46, which preferably takes the form of a resilient pad or washer, is compressed between the underside of the leaf spring and the upper face of plate 38 by threading nuts 48 on the U-bolt 44 into engagement with the underside of plate 38 to draw the forward ends of the beams and the spring firmly together.

In operation, during periods of high vehicle acceleration, a torque is experienced about the rear axle 14 as shown by the curved arrow T. This torque causes the traction bar to rotate in a clockwise direction as viewed in FIG. 1. Since the traction bar is attached at its forward end to the leaf spring 22, rotation of the traction bar will be restrained, but an upward force $F_1$ will be transmitted through the bar and exerted on the leaf spring at the forward end of the bar. This force $F_1$ will, in turn, be transmitted through the short remaining distance of the leaf spring and through the spring mounting 42 to the frame 43 of the vehicle, resulting in an upward force $F_2$ to be exerted upon the frame of the vehicle adjacent the leaf spring mounting. The upward force $F_2$ tends to cause the frame to rotate in a clockwise direction as viewed in FIG. 1 to produce a downward force $F_3$ adjacent but to the rear of axle 14, improving traction of the vehicle wheels on the pavement.

In the prior traction bar assemblies, the rear mounting plate 12 has been prebored so as to provide a pair of apertures to either side of the beams for receiving the legs of the axle mounting U-bolts 18 and 20. These bolt receiving apertures are spaced at differing intervals from each other depending upon the width of the leaf springs 22 and the diameter of the axle housing 14. If the traction bar, for example, is to be mounted on a vehicle having relatively wide leaf springs, the U-bolts 18 and 20 will be separated from each other by a relatively large distance and accordingly the spacing between the apertures on opposite sides of the plate will be greater than if the leaf springs are relatively narrow. In addition, the spacing of the apertures at opposite ends of the plate must be greater where the axle housing 14 is of larger diameter than where the housing is of a relatively small diameter since the distance between the legs of each U-bolt will be greater in the case of the large diameter housing.

Accordingly in the past, a large number of different traction bar assemblies having prebored holes at differing spaced distances had to be stocked in order to provide for mounting on the wide variety of axle housing diameters and spring widths encountered in different vehicles. The mounting plate 12 of my invention obviates this need and a single, or at most a few traction bars, need be stocked to accommodate a wide variety of spring width and axle housing diameters which might be encountered.

In the mounting of my invention, as illustrated, four substantially rectangular symmetrical apertures 50, 51, 52 and 53 are formed in the plate 12 by stamping or otherwise removing a tapered symmetrical piece of the plate 54, 55, 56 and 57 at spaced intervals, as shown at FIG. 2. As stated, these pieces may have three, four or more sides. The apertures 50, 51, 52 and 53 which are so formed are tapered over their thickness, the cross-sectional area of the aperture opening 59 in the top face of the plate 12 being smaller than the cross-sectional area of the opening 60 in the bottom face of the plate. The remaining scrap pieces or plugs 54, 55, 56 and 57 which are removed from the plate also have tapered sidewalls 62, as shown in FIGS. 4 and 5, the upper and lower faces of each plug being substantially equal in area to the upper and lower aperture openings 59 and 60, respectively. After the scrap pieces have been removed from the plate, an offcentered hole is formed in each of the scrap pieces or plugs for receiving the U-bolts 18 and 20 by stamping or milling a hole or a notch 64 adjacent one of the corners of each of the plugs.

When it is desired to mount the traction bar on a vehicle, the plugs 54, 55, 56 and 57 are reinserted from the bottom into the tapered apertures 50, 51, 52 and 53. Since each of the plugs is symmetrical, the notched corners of the plugs may be positioned in any one of the four corners of the apertures such that the distance between the notches 64 of the plugs may be selectively varied depending upon the orientation of the individual plugs in their apertures. So positioned, the plug and bolt are restrained from movement in any direction. This arrangement is an improvement over the use of slots or oversize holes in the plate to accommodate more dimensions. By way of example, referring to FIG. 2, if the notches 64 are positioned so as to each be adjacent the corners of the plate 12 as shown in solid lines, the spacing between the notches is maximized such that the traction bar may be mounted on a vehicle having both a large diameter axle housing and large width spring. Conversely, the plugs may be inserted in their apertures such that their notches 64 are nearest the center of the plate 12 as shown by the dot and dash lines in FIG. 2, minimizing the distance between the holes where the spring width and axle diameter are small. It will be appreciated that several other notch-spacing variations are possible other than the solid and dot and dash line variations shown in FIG. 2.

Since the apertures and plugs both have tapered sidewalls over their thickness, the plugs can be inserted from the bottom of the plate 12 and moved upward until the plugs are flush with the plate. When the plugs and plate are flush, further upward movement ceases due to wedging of the inclined sides 62 against the aperture walls. Thus, after the plugs have been positioned in their apertures with their notches at the desired spaced distances from each other, the axle mounting U-bolts 18 and 20 are then inserted through the offcenter holes formed by the notches 64 and nuts 32 are threaded upward against the underside of the plate and the plugs. When the nuts 32 are tightened, each plug is wedged firmly into its tapered aperture and prevented from falling from the plate 12 in the final installation.

An additional hole 66 is provided in the center of the plate 12 preferably of a substantially larger diameter than nut 36 in order to accommodate and allow access to the nut 36 in the final installation.

It should be understood that the embodiment of the present invention which has been described is merely illustrative of an application of the principles of the invention. Numerous modifications may be made by those skilled in the art without departing from the true spirit and scope of the invention.

What I claim is:

1. A vehicle traction bar which is adapted to extend in underlying parallel relation to the leaf spring of the vehicle at the drive axle thereof and be attached at its ends to the leaf spring, said traction bar comprising:

An elongated rigid bar, first mounting means for mounting one end of said bar to the leaf spring adjacent the location where the leaf spring is attached to the vehicle, a rigid mounting plate mounted at other end of said bar, second mounting means for mounting said plate and said other end of said bar to the axle and leaf spring adjacent the axle, at least two pairs of symmetric polygonal apertures defined in said second plate, each of said pairs of apertures being laterally spaced from the axis of said bar on opposite sides thereof, and two pairs of symmetric polygonal plugs removably positioned in each of said polygonal apertures, each of said polygonal plugs having an offcenter notch defined therein which extends through the thickness thereof for receiving said second mounting means, said notch being defined by the absence of at least one of the corners of its polygonal plug, said plugs being selectively positionable in said polygonal apertures such that the notches of said plugs may be selectively positioned in different corners of their respective polygonal apertures for varying the distance between the notches of said plugs on one side of said bar depending upon the diameter of the axle and the distance between the notches of said plugs on opposite sides of said bar depending upon the width of the leaf spring, whereby a given one of said traction bars may be mounted on vehicles having differing axle diameters and leaf spring widths.

2. The traction bar of claim 1, wherein said plugs and their respective apertures are substantially rectangular in shape.

3. The traction bar of claim 1, wherein the cross-sectional area of said apertures in which said plugs are positioned is smaller adjacent one face of the plate than adjacent the other face of the plate, and the cross-sectional area of said plugs is also smaller adjacent one face of the plugs than adjacent the other face, whereby said plugs can only be inserted into or removed from their respective apertures from one side of said plate.

4. The traction bar of claim 3, wherein both said plugs and their respective apertures are tapered over their thickness.

5. The traction bar of claim 3, wherein when said plugs are inserted in their respective apertures, the opposed faces of said plugs and said plate are substantially coplanar.